(12) United States Patent
Liu (10) Patent No.: US 11,524,925 B1
(45) Date of Patent: Dec. 13, 2022

(54) CONVENIENT AND QUICKLY-ASSEMBLED ROTARY COMPOSTING BARREL AND QUICK ASSEMBLY METHOD THEREOF

(71) Applicant: Yingshen Liu, Qingdao (CN)

(72) Inventor: Yingshen Liu, Qingdao (CN)

( * ) Notice: Subject to any disclaimer, the term of this patent is extended or adjusted under 35 U.S.C. 154(b) by 0 days.

(21) Appl. No.: 17/720,323

(22) Filed: Apr. 14, 2022

(51) Int. Cl.
| | | |
|---|---|---|
| C05F 17/95 | (2020.01) | |
| C05F 17/964 | (2020.01) | |
| C05F 17/914 | (2020.01) | |
| C05F 17/921 | (2020.01) | |
| C05F 17/929 | (2020.01) | |
| C05F 17/907 | (2020.01) | |
| B01F 29/63 | (2022.01) | |
| B01F 29/00 | (2022.01) | |
| B01F 101/33 | (2022.01) | |

(52) U.S. Cl.
CPC .......... *C05F 17/95* (2020.01); *B01F 29/4031* (2022.01); *B01F 29/40221* (2022.01); *B01F 29/63* (2022.01); *C05F 17/907* (2020.01); *C05F 17/914* (2020.01); *C05F 17/921* (2020.01); *C05F 17/929* (2020.01); *C05F 17/964* (2020.01); *B01F 2101/33* (2022.01); *B02C 2201/06* (2013.01); *Y02P 20/145* (2015.11)

(58) Field of Classification Search
CPC .............. B01F 2101/33; B01F 29/4031; B01F 29/40221; C05F 17/907; C05F 17/914; C05F 17/964; B02C 2201/66
USPC ..................................................... 435/290.3
See application file for complete search history.

(56) References Cited

U.S. PATENT DOCUMENTS 1,391,900 A * 9/1921 McCrery .................. B65D 9/22
217/44
5,589,391 A * 12/1996 Fink ...................... C05F 17/907
435/290.3
(Continued)

FOREIGN PATENT DOCUMENTS

EP 210382 A1 * 6/1986
WO WO-2009158692 A1 * 12/2009 .......... C05F 17/0205

*Primary Examiner* — Marc C Howell
(74) *Attorney, Agent, or Firm* — Rumit Ranjit Kanakia (57) ABSTRACT

The present application provides a convenient and quickly-assembled rotary composting barrel and a quick assembly method thereof. On the one hand, the solution provides a convenient and quickly-assembled composting barrel, which comprises two lateral plates, a bearing plate and several surrounding plates, wherein the lateral plates and the bearing plate are respectively provided with the first clamping grooves and the second clamping grooves, and nuts are pre-installed in the first clamping grooves and the second clamping grooves, and the surrounding plate is provided with through-holes through which bolts penetrate at corresponding positions; on the other hand, the solution provides a quick assembly method of the rotary composting barrel, in which by screwing bolts with pre-installed nuts, the bearing plate is connected with the surrounding plate first, and then the lateral plates are connected with the surrounding plates at both sides quickly. The existing rotary composting barrel is inconvenient and time-consuming to install. The rotary composting barrel involved in this solution is ingenious in structural design. It is very convenient to install, and the assembly time is shortened by more than half. It is skillful and environment-friendly when used in conjunction with an unloading cart.

10 Claims, 13 Drawing Sheets

(56) References Cited

U.S. PATENT DOCUMENTS

| | | | | |
|---|---|---|---|---|
| 5,762,225 | A  * | 6/1998 | Byrd | C05F 17/907 |
| | | | | 220/802 |
| 2005/0172817 | A1* | 8/2005 | Berecz | B65D 9/04 |
| | | | | 99/275 |
| 2006/0154362 | A1* | 7/2006 | Sundberg | C05F 17/907 |
| | | | | 435/290.3 |
| 2007/0007738 | A1* | 1/2007 | Albert | B62B 1/206 |
| | | | | 280/47.31 |
| 2013/0052726 | A1* | 2/2013 | Ashby | C05F 17/907 |
| | | | | 435/290.3 |

* cited by examiner

CONVENIENT AND QUICKLY-ASSEMBLED ROTARY COMPOSTING BARREL AND QUICK ASSEMBLY METHOD THEREOF

TECHNICAL FIELD

The present application relates to a convenient and quickly-assembled rotary composting barrel and a quick assembly method thereof.

BACKGROUND

A composting barrel is a kind of composting fermentation equipment that converts kitchen waste and household garbage into fertilizer. Common composting barrels are generally vertical and rotary. Because the contents of rotary composting barrel can rotate along with the rotation of composting barrel, the stirring and mixing of contents are more uniform. So rotary composting barrel is also favored by more consumers. The existing rotary composting barrel includes a bracket and a barrel body rotating on the bracket. The barrel is surrounded by two lateral plates and a plurality of surrounding plates, one of which is provided with material openings and cover plates for closing the material opening, and the connection between the lateral plates and the surrounding plates is realized by bolts and nuts. Because of the large number of surrounding plates, the assembly of the lateral plates and the surrounding plates is time-consuming. In addition, the nuts are placed inside the compost barrel and the bolts are inserted outside. So when the last surrounding plate is installed, it is necessary to put your hands through the center of the material opening. Due to the limitation of space, it is difficult to assemble. In addition, with the use of composting barrel, after the bolts and nuts are loosened to some extent, the secondary fastening is also very inconvenient.

SUMMARY

In view of the shortcomings in the above problems, the present application provides a convenient and quickly-assembled rotary composting barrel and its quick assembly method.

To solve the above problems, on the one hand, the present application provides a convenient and quickly-assembled rotary composting barrel, which including a bracket and a barrel body rotating relative to the bracket, wherein the barrel body is surrounded by two lateral plates and a plurality of surrounding plates, wherein a hand wheel is arranged outside the lateral plate, and at least one bearing plate is arranged between the two lateral plates. The bearing plate and the lateral plate are both structural stress members. The bearing plate has at least the same bearing strength as the lateral plate. The bearing plate is provided with an integrated positioning protrusion, and the surrounding plate is provided with a positioning groove matched with the positioning protrusion. The bearing plate and the lateral plate divide an inner cavity of the barrel into a plurality of units while ensuring the structural strength of the barrel. At least one of the surrounding plates is provided with material openings communicated with each unit and the material openings are provided with cover plates for blocking the material opening; the lateral plate is provided with an integrally formed retaining edge which is provided with the first clamping grooves for pre-installing nuts. A projecting edge of the bearing plate is provided with the second clamping grooves for pre-installing the nuts, the first clamping grooves and the second clamping grooves can both limit the rotation of the pre-assembled nuts, and the surrounding plates are provided with through holes for bolts to pass through at positions corresponding to the first clamping grooves and the second clamping grooves; the bolts pass through the through-holes and are screwed into the nuts pre-installed on the first clamping grooves and the second clamping grooves to realize the quick assembly of the barrel.

Nuts are pre-positioned and installed in the first clamping grooves and the second clamping grooves to limit the rotation. Bolts are screwed in outside to realize the connection between the surrounding plates, the bearing plate and the lateral plates, thus realize quick assembly.

As a further improvement of the solution, the hand wheel forms a circumscribed circle of the lateral plate or a concentric circle with a diameter larger than the circumscribed circle; the lateral plate and the hand wheel can be obtained by integral injection molding.

In the technical solution, it is convenient to rotate the barrel body through the hand wheel, and the size of the hand wheel can be slightly larger than the circumscribed circle of the lateral plate, which is more convenient to provide grip points. The integrated injection molding process is efficient and the obtained product is beautiful.

As a further improvement of the solution, one side of the surrounding plate along the front-back direction has a turned-up part bent inward, and the turned-up part is pressed against the adjacent surrounding plate;

In the technical solution, the surrounding plates are jointed with each other through the turned-up parts; so that there is no seam between the surrounding plates, and the leakage of granular materials is avoided.

As a further improvement of the solution, the inner wall of the surrounding plate is provided with a plurality of stirring blocks which protrude inward;

In the technical solution, a plurality of stirring blocks protruding inward are designed, which not only strengthen the structure, but also can stir the inner container in the barrel, so as to facilitate the mixed fermentation of organic substances in the barrel.

As a further improvement of the solution, the cross section of the first clamping groove is square or T-shaped; one end of the first clamping groove is open; the nut is a square nut or a T-shaped nut; the size of the nut is matched with that of the first clamping groove, and the second clamping groove has the same shape as that of the first clamping groove.

In the technical solution, the square nut in the first clamping groove is inserted through the open end, which is convenient for assembly; the square nut and the first clamping groove are in interference fit, so that the square nut can not easily slide out of the position of the first clamping groove without rotating; the second clamping groove and the first clamping groove are designed in the same shape; all these designs make the processing easy and the integrity of the product strong.

As a further improvement of the solution, the barrel also includes a matched unloading cart, the height of which is smaller than the distance between the barrel and the ground, and the width of which is smaller than the width of the bracket.

In the technical solution, the contents of the barrel body can be conveniently transferred by the unloading cart.

As a further improvement of the solution, the unloading cart is provided with a front leg brace which can swing at a small angle and a locking screw for limiting the free swing of the front leg brace;

In the technical solution, the swing of the front leg brace is convenient for the unloading cart to enter or leave the bottom of the compost barrel; the swing of the front leg brace is limited by the locking screw, thus ensuring the stability of the unloading truck during material transfer.

Figure 1:
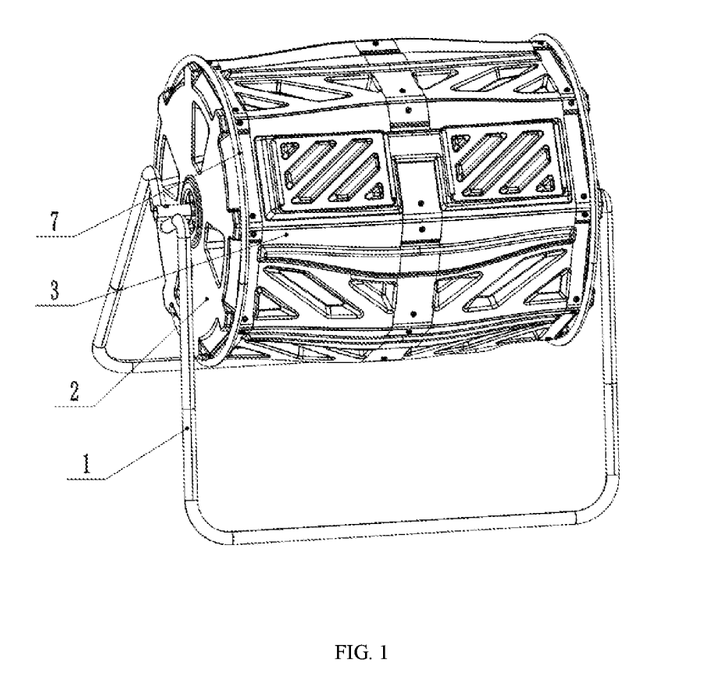
FIG. 1 is a stereogram of a convenient and quickly-assembled rotary composting barrel.
Figure 2:
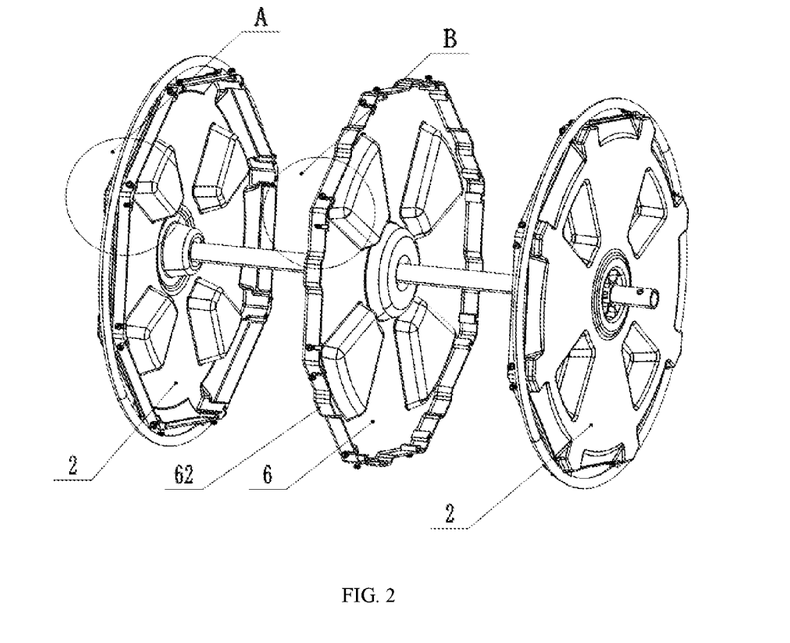
FIG. 2 is a schematic diagram of the barrel body after the surrounding plate is hidden.
Figure 3:
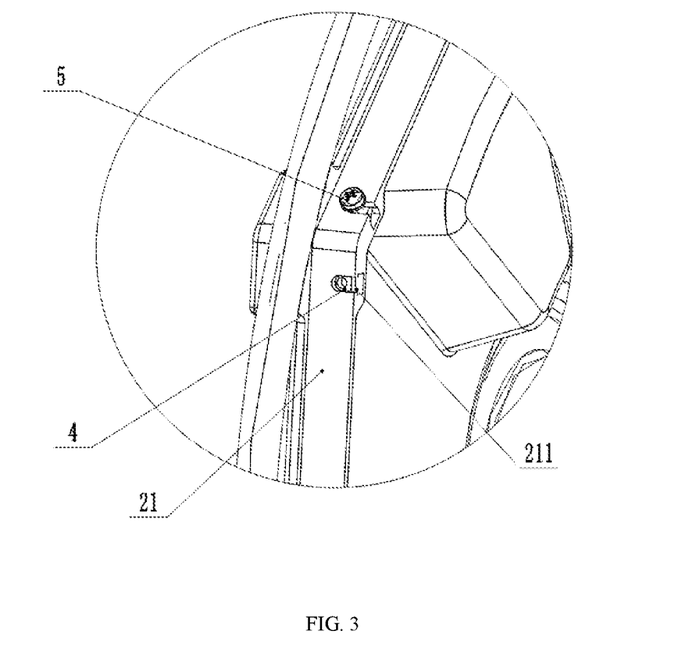
FIG. 3 is an enlarged view of position a in FIG. 2.
Figure 4:
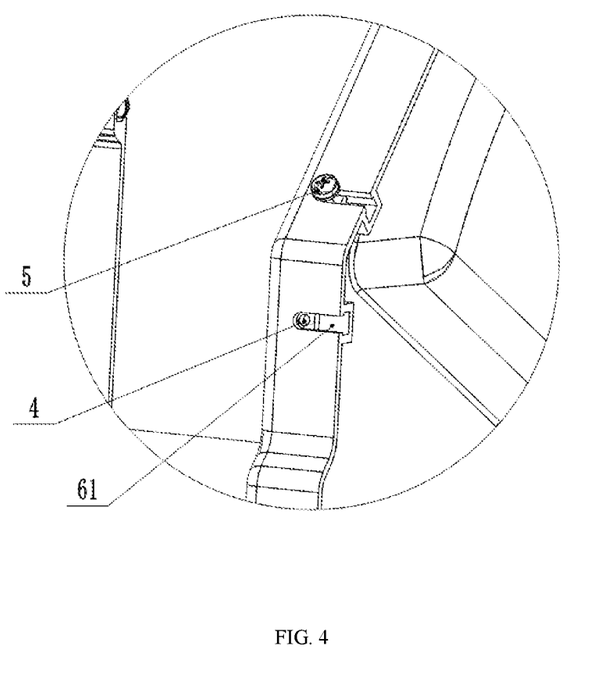
FIG. 4 is an enlarged view of position b in FIG. 2.
Figure 5:
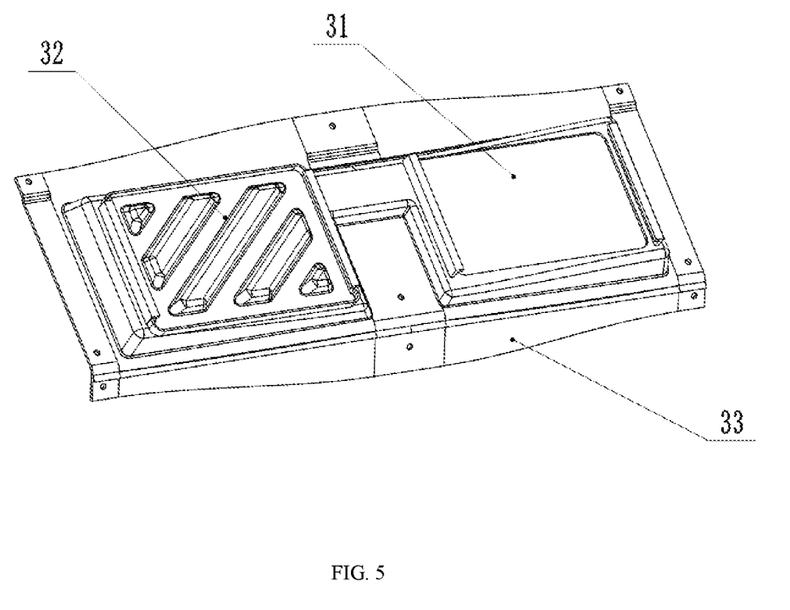
FIG. 5 is a schematic diagram of the surrounding plate (with a material opening)
Figure 6:
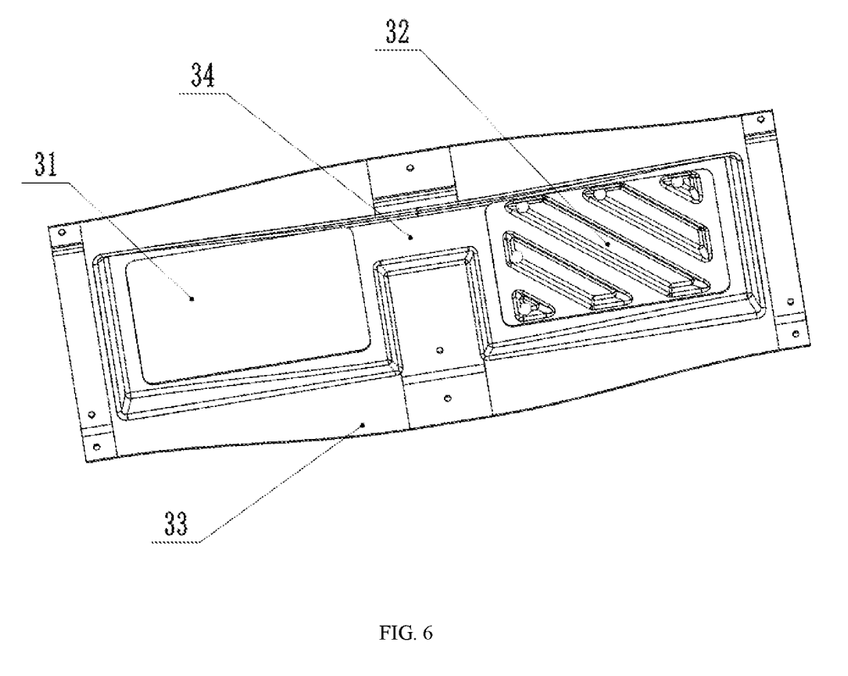
FIG. 6 is a schematic diagram of the other direction of the surrounding plate (provided with a material opening)
Figure 7:
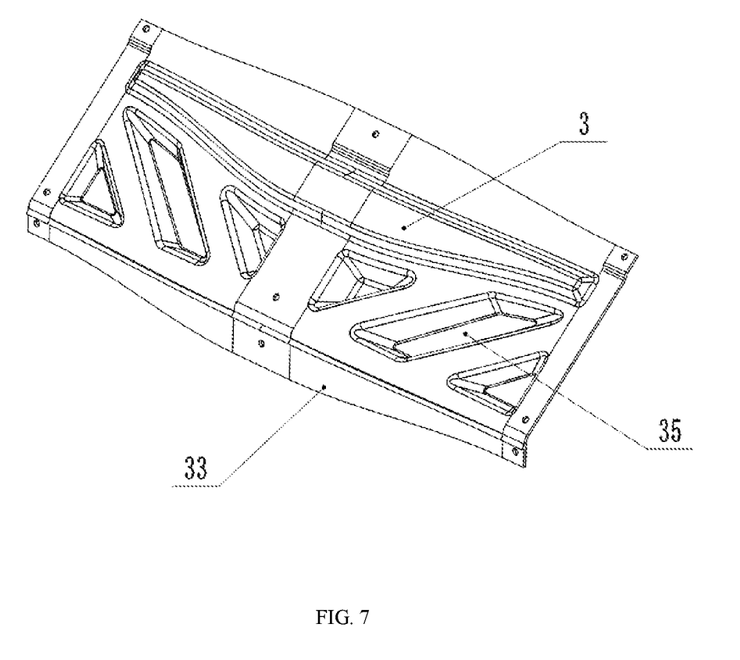
FIG. 7 is a schematic diagram of the surrounding plate.
Figure 8:
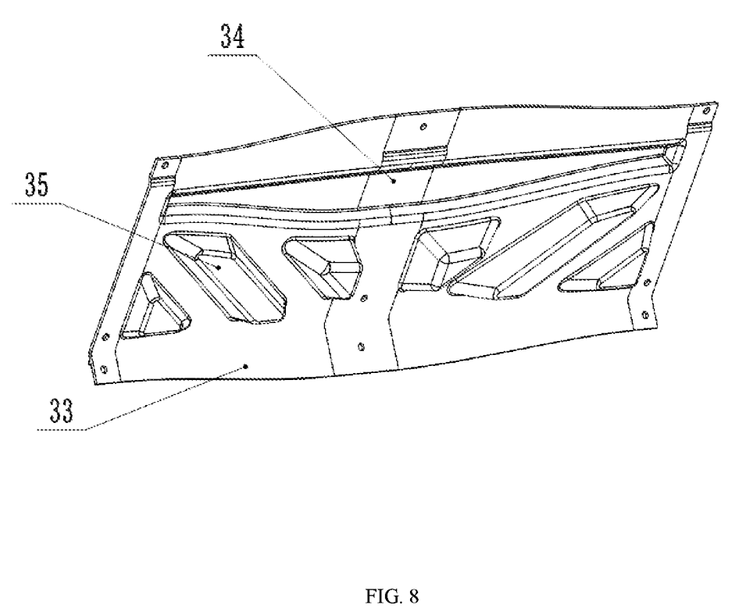
FIG. 8 is a schematic view of the other direction of the surrounding plate.
Figure 9:
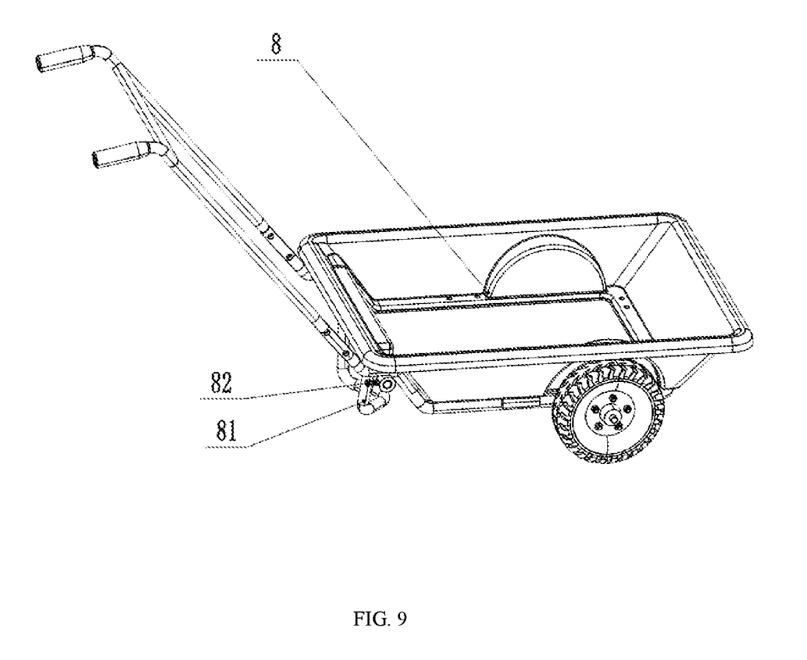
FIG. 9 is a schematic diagram of the unloading cart.
Figure 10:
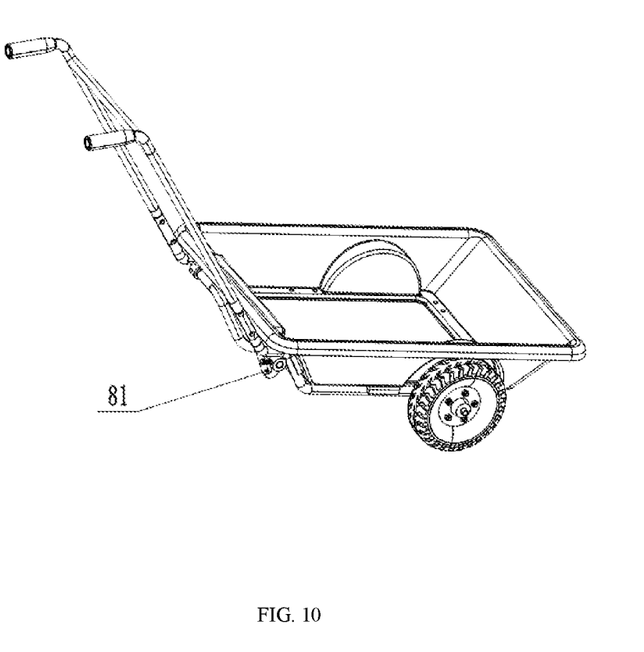
FIG. 10 is a schematic diagram of the front leg brace of the unloading cart in FIG. 9 folded.
Figure 11:
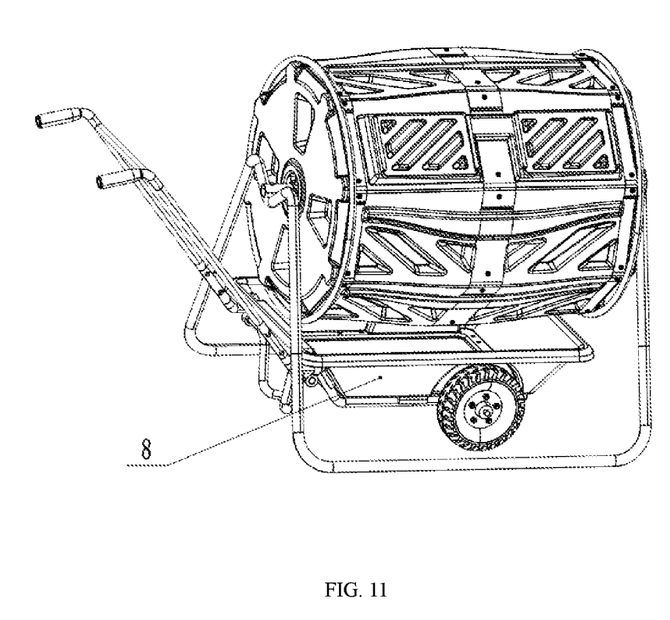
FIG. 11 is a schematic diagram of the compost barrel used in conjunction with the unloading cart.
Figure 12:
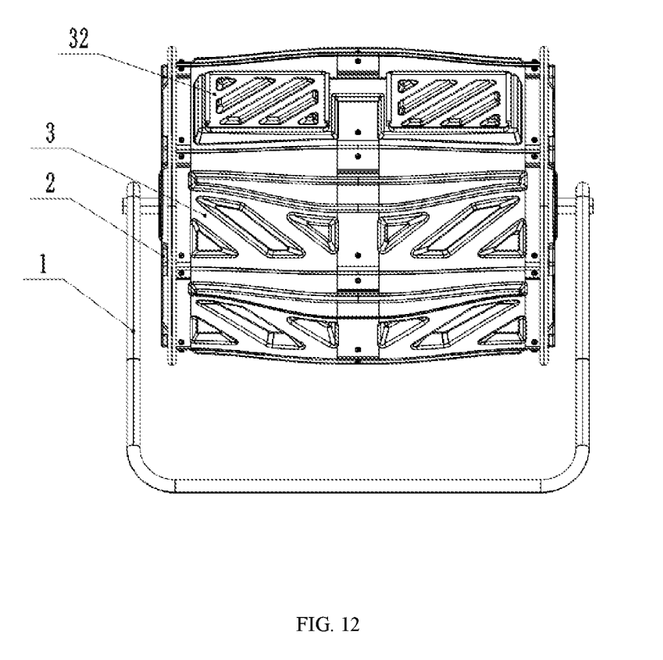
FIG. 12 is a front view of a convenient and quickly-assembled rotary composting barrel.
Figure 13:
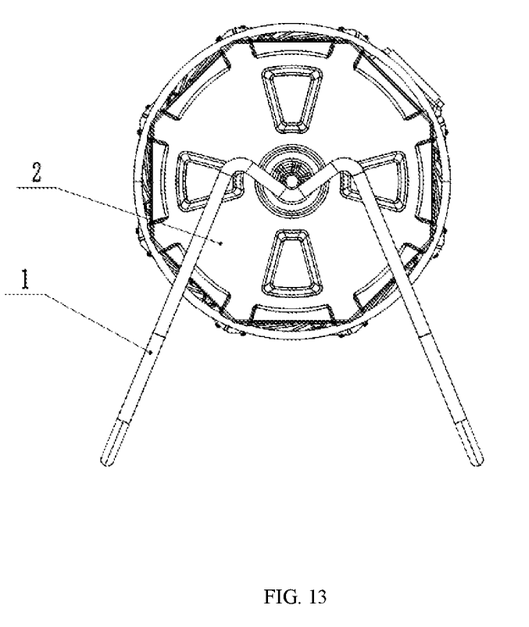
FIG. 13 is a side view of a convenient and quickly-assembled rotary composting barrel of the present application.

On the other hand, the present application provides a quick assembly method of a rotary composting barrel, which includes the following steps:

a. pre-installing nuts in second clamping grooves of bearing plate and nuts in the first clamping grooves of the lateral plates;

b, stringing two lateral plates and the bearing plate together with the upper beam of the bracket in turn to form an inner frame structure of the barrel (as shown in FIG. 2);

c, aligning the position of a surrounding plate with the bearing plate, and screwing a bolt through the surrounding plate into the nut pre-installed in the second clamping groove to realize fixed connection;

d, sequentially completing the fixed connection between the adjacent surrounding plates and the bearing plate;

e, putting the two lateral plates in place at the sides of the assembled surrounding plates, and screwing the bolts through the surrounding plates into the nuts pre-installed in the first clamping grooves to realize fixed connection, thus obtaining the barrel structure;

f, placing the upper beam above the bracket and completing the assembly.

As a further improvement of the solution, in step c, the surrounding plate is matched with the positioning protrusion of the bearing plate through the positioning groove to realize quick positioning.

In the technical solution, the interaction between the positioning protrusion and the positioning groove realizes the accurate positioning of the surrounding plate and is convenient for assembly.

As a further improvement of the solution, in step d, one side of the surrounding plate with the turned-up part is overlapped with and pressed against the other side of the adjacent surrounding plate without the turned-up part through the turned-up part, then a fixed connection is realized by screwing bolt into the nut.

In the technical solution, the surrounding plates are overlapped with each other through the turned-up parts, so that there is no seam between the surrounding plates, and the leakage of granular materials is avoided.

Compared with the prior design, the present application has the beneficial effects that the existing rotary composting barrel is inconvenient and time-consuming to install. The rotary composting barrel related to this solution is ingenious in structural design, very convenient to install, and the assembly time is shortened by more than half. It is smart and environment-friendly, when used in conjunction with the unloading cart.

In the figures: 1. Bracket; 2. Lateral plate; 21, Retaining edge; 21. First clamping groove; 3. Surrounding plate; 31. Material opening; 32. Cover plate; 3. Turned-up part; 34. Positioning groove; 35. Stirring block; 4. Nut; 5. Bolt; 6. Bearing plate; 61. Second clamping groove; 62. Positioning protrusion; 7. Hand wheel; 8. Unloading cart; 81. Front leg brace; 82. Locking screw

DESCRIPTION OF EMBODIMENTS

In order to solve the problems of inconvenient and time-consuming assembly of the existing rotary composting barrel, this solution provides a convenient and quickly-assembled rotary composting barrel and a quick assembly method thereof As shown in FIGS. 1-11, in the first aspect of the present application, there is provided a convenient and quickly-assembled rotary composting barrel, including a bracket 1 and a barrel body rotating relative to the bracket 1, wherein the barrel body is surrounded by two lateral plates 2 and a plurality of surrounding plates 3; wherein a hand wheel 7 is arranged outside the lateral plate 2, and at least one bearing plate 6 is arranged between the two lateral plates 2; the bearing plate 6 and the lateral plate 2 are both structural stress members; the bearing plate 6 has at least the same bearing strength as the lateral plate 2;

the bearing plate 6 is provided with an integrated positioning protrusion 62, and the surrounding plate 3 is provided with a positioning groove 34 matched with the positioning protrusion 62; the bearing plate 6 and the lateral plate 2 divide an inner cavity of the barrel into a plurality of units while ensuring the structural strength of the barrel; at least one of the surrounding plates 3 is provided with material openings 31 communicated with each unit and the material openings are provided with cover plates 32 for blocking the material opening 31; the lateral plate 2 is provided with an integrally formed retaining edge 21 which is provided with the first clamping grooves 211 for pre-installing nuts 4. A projecting edge of the bearing plate 6 is provided with the second clamping grooves 61 for pre-installing the nuts 4. The first clamping groove 211 and the second clamping groove 61 can both limit the rotation of the pre-assembled nuts 4, and the surrounding plate 3 is provided with through-holes for bolts 5 to pass through at positions corresponding to the first clamping grooves 211 and the second clamping grooves 61; the bolts 5 pass through the through-holes and are screwed into the nuts 4 pre-installed on the first clamping grooves 211 and the second clamping grooves 61 to realize the quick assembly of the barrel; the hand wheel 7 forms a circumscribed circle of the lateral plate 2 or a concentric circle with a diameter larger than that of the circumscribed circle. The lateral plate 2 and the hand wheel 7 can be obtained by integrated injection molding, so that the barrel body can be easily rotated by the hand wheel. The size of the hand wheel can be slightly larger than the circumscribed circle of the lateral plate, which is more convenient to provide grip points. The process of integrated injection molding is efficient and the obtained product is beautiful. One side of the surrounding plates 3 along the front-back direction is provided with a turned-up part 33 bent inward; the turned-up part 33 is pressed against the adjacent surrounding plates 3, and the surrounding plates are overlapped with each other through the turned-up part. So that there is no seam between the surrounding plates and the leakage of granular materials is avoided. The inner wall of the surrounding plate 3 is provided with a plurality of stirring blocks 35 protruding inward; A plurality of stirring blocks protruding inward are designed. So that the structure is strengthened, and at the same time, the inner container in the barrel can be stirred; so that organic matters in the barrel can be mixed and fermented conveniently. The cross section of the first clamping groove 211 is square or T-shaped, and one end of the first clamping groove 211 is open; the size of the nut 4 is square or T-shaped and match with the first clamping groove 211; the shape of the second clamping groove 61 is as same as that of the first clamping groove 211; the square nut is inserted into the first clamping groove through the open end, which is convenient for the assembly of the square nut; the square nut and the T-shaped nut are interference-fitted, so that the square nut can not easily slide out of the position of the first clamping groove without rotating; the second clamping groove and the first clamping groove are designed in the same shape. All these design makes the processing easy and the integrity of the product strong; it also includes a matched unloading cart 8, the height of which is smaller than the distance between the barrel and the ground, and the width of which is smaller than the width of the bracket 1, so that the contents of the barrel can be conveniently transferred by the unloading cart; the unloading cart 8 has a front leg brace 81 which can swing at a small angle and a locking screw 82 which is used to limit the free swing of the front leg brace 81; by swinging the front leg brace, it is convenient for the unloading cart to enter or leave the bottom of the compost barrel. By locking the front leg brace by the locking screw, the stability of the unloading cart is ensured.

In the second aspect of the present application, there is provided a quick assembly method of a rotary composting barrel, which comprises the following steps:

a. pre-installing nuts 4 in a second clamping grooves 61 of the bearing plate 6 and nuts 4 in the first clamping grooves 211 of the lateral plates 2;

b, stringing two lateral plates 2 and the bearing plate 6 together with the upper beam in turn to form an inner frame structure of the barrel as shown in FIG. 2;

c, aligning the position of a surrounding plate 3 with the bearing plate 6, and screwing a bolt 5 through the surrounding plate 3 into the nut 4 pre-installed in the second clamping groove 61 to realize fixed connection;

d, sequentially completing the fixed connection between the adjacent surrounding plates 3 and the bearing plate 6;

e, putting the two lateral plates 2 in place at the sides of the assembled surrounding plates 3, and screwing the bolts 5 through the surrounding plates 3 into the nuts 4 pre-installed in the first clamping grooves 211 to realize fixed connection, thus obtaining the barrel structure;

f, placing the upper beam above the bracket 1 and completing the assembly.

In step c, the surrounding plate 3 is matched with the positioning protrusion 62 of the bearing plate 6 through the positioning groove 34 to realize quick positioning, and the interaction between the positioning protrusion and the positioning groove realizes the accurate positioning of the surrounding plate, which is convenient for assembly.

In step d, one side of the surrounding plate 3 with the turned-up part 33 is overlapped with and pressed against the other side of the adjacent surrounding plate 3 without the turned-up part 33 through the turned-up part 33 and compacted, then the bolts 5 are screwed into the nuts 4 to realize the fixed connection. The surrounding plates are overlapped with each other through the turned-up parts, so as to ensure that there is no seam between the surrounding plates and avoid the leakage of granular materials.

The existing rotary composting barrel is inconvenient and time-consuming to install. The rotary composting barrel involved in this solution is ingenious in structural design, very convenient to install, and the assembly time is shortened by more than half. It is smart and environment-friendly when used in conjunction with the unloading cart.

The foregoing is only the preferred embodiment of the present application, and it is not intended to limit the present application, which is subject to various modifications and variations for the technical personnel in the field. Any modification, equivalent substitution, improvement, etc. made within the spirit and principle of the present application shall be included in the scope of protection of the present application.

What is claimed is:

1. A convenient and quickly-assembled rotary composting barrel, comprising:
   a bracket, and a barrel body rotating relative to the bracket,
   wherein the barrel body is surrounded by two lateral plates and a plurality of surrounding plates;
   wherein a hand wheel is arranged outside of each of the two lateral plates, and at least one bearing plate is arranged between the two lateral plates;
   the bearing plate and each of the two lateral plates are both structural stress members;
   the bearing plate has at least the same bearing strength as the two lateral plates; the bearing plate is provided with an integrated positioning protrusion, and each of the plurality of surrounding plates are provided with a positioning groove to match with the positioning protrusion;
   the bearing plate and the two lateral plates divide an inner cavity of the barrel body into a plurality of units while ensuring the structural strength of the barrel, and at least one surrounding plate of the plurality of surrounding plates is provided with material openings to communicate with each unit separately, and the material openings are provided with cover plates for blocking the material openings;
   each of the two lateral plates are provided with a plurality of integrally formed retaining edges, each comprises a first pair of clamping grooves formed at distal ends spaced apart relationship for pre-installing nuts;
   a plurality of projecting edges of the bearing plate, each comprises a second pair of clamping grooves formed at distal ends in spaced apart relationship for pre-installing the nuts, when the integrated positioning protrusion of the bearing plate is provided between the second pair of clamping grooves;
   the first pair of clamping grooves and the second pair of clamping grooves can both limit the rotation of the pre-assembled nuts, wherein the first pair of clamping grooves and the second pair of clamping grooves lies along a same line along a length of the barrel body;

wherein each of the plurality of surrounding plates is provided with through-holes for bolts to pass through at positions corresponding to the first pair of clamping grooves and the second pair of clamping grooves, wherein the positioning groove of each of the plurality of surrounding plates is located between the through-holes of a central portion of the surrounding plate;

the bolts pass through the through-holes and are screwed into the nuts pre-installed in the first pair of clamping grooves and the second pair of clamping grooves to realize the quick assembly of the barrel body.

2. The convenient and quickly-assembled rotary composting barrel according to claim 1, wherein the hand wheel forms a circumscribed circle of each of the two lateral plates or a concentric circle with a diameter larger than that of the circumscribed circle, and each of the two lateral plates and the hand wheel are obtained by integral injection molding.

3. The convenient and quickly-assembled rotary composting barrel according to claim 1, wherein one side of at least one surrounding plate of the plurality of surrounding plates along a front-back direction comprises a turned-up part bent inward and the turned-up part is pressed against an adjacent surrounding plate of the plurality of surrounding plates.

4. The convenient and quickly-assembled rotary composting barrel according to claim 1, wherein an inner wall of at least one of surrounding plate of the surrounding plate is provided with a plurality of stirring blocks protruding inward.

5. The convenient and quickly-assembled rotary composting barrel according to claim 1, wherein the cross section of the first pair of clamping grooves on each projecting edge of the plurality of projecting edges are square or T-shaped, one end of the first pair of clamping grooves is open, the nut is a square nut or a T-shaped nut with a size matched with the first pair of clamping grooves, and the second pair of clamping grooves has a same shape as the first pair of clamping grooves.

6. The convenient and quickly-assembled rotary composting barrel according to claim 1, further comprising a matched unloading cart, the height of which is smaller than a distance between the barrel body and the ground when the barrel body is places on the bracket, and the width of which is smaller than the width of the bracket.

7. The convenient and quickly-assembled rotary composting barrel according to claim 6, wherein the unloading cart is a wheeled cart with a bin and handles, the unloading cart having a front leg brace provided below the handles and is configured to swing at a small angle, and a locking screw coupled to the front leg brace to limit the free swing of the front leg brace.

8. A quick assembly method of a rotary composting barrel, comprising:

a. pre-installing nuts in a second pair of clamping grooves of a bearing plate, and pre-installing nuts in a first pair of clamping grooves of each of the two lateral plates;

b. stringing each of the two lateral plates and the bearing plate together with an upper beam in turn to form an inner frame structure of a barrel body;

c. aligning a plurality of surrounding plate with the bearing plate, wherein bearing plate is provided with an integrated positioning protrusion, and each of the plurality of surrounding plates are provided with a positioning groove to match with the positioning protrusion for alignment, and screwing bolts through each of the plurality of surrounding plates and into the nut pre-installed in the second pair of clamping grooves to realize a fixed connection;

d. sequentially completing the fixed connection between the adjacent surrounding plates of the plurality of plates and the bearing plates;

e. putting each of the two lateral plates in place at the both sides of the plurality of surrounding plates, and screwing the bolts through the plurality of surrounding plates into the nuts pre-installed in the first pair of clamping grooves to realize the fixed connection, thus obtaining the barrel body;

f. placing the upper beam onto the bracket, thereby forming the barrel, and wherein each of the two lateral plates are provided with a plurality of integrally formed retaining edges, each comprises the first pair of clamping grooves formed at distal ends in spaced apart relationships for pre-installing the nuts;

a plurality of projecting edges of the bearing plate, each comprises the second pair of clamping grooves formed at distal ends in spaced apart relationship for pre-installing the nuts, wherein the integrated positioning protrusion of the bearing plate is provided between the second pair of clamping grooves;

the first pair of clamping grooves and the second pair of clamping grooves both limit the rotation of the pre-assembled nuts, wherein the first pair of clamping grooves and the second pair of clamping grooves, wherein each of the plurality of surrounding plates is provided with through-holes for the bolts to pass through at positions corresponding to the first pair of clamping grooves and the second pair of clamping grooves, wherein the positioning groove of each of the plurality of surrounding plates is located between the through-holes of a central portion of the surrounding plate.

9. The quick assembly method of the rotary composting barrel according to claim 8, wherein in step c, the surrounding plate is matched with the positioning protrusion of the bearing plate through the positioning groove to realize quick positioning.

10. The quick assembly method of the rotary composting barrel according to claim 8, wherein in step d, wherein one side of at least one of the surrounding plate of the plurality of surrounding plates along a front-back direction comprises a turned-up part bent inward, and the turned-up part is pressed against an adjacent surrounding plate of the plurality of surrounding plates one side of the surrounding plate with the turned-up part is overlapped with and pressed against the other side of the adjacent surrounding plate without the turned-up part and then the bolt is screwed into the nut to realize the fixed connection.

* * * * *